United States Patent [19]

Gluck et al.

[11] Patent Number: 4,764,420
[45] Date of Patent: Aug. 16, 1988

[54] FOAM INSULATION BOARD FACED WITH POLYMER-FIBROUS SHEET COMPOSITE

[75] Inventors: David G. Gluck, St. Petersburg; Wayne E. Laughlin, Gulfport, both of Fla.

[73] Assignee: The Celotex Corporation, Tampa, Fla.

[21] Appl. No.: 148,393

[22] Filed: Jan. 25, 1988

Related U.S. Application Data

[63] Continuation-in-part of Ser. No. 883,806, Jul. 9, 1986.

[51] Int. Cl.[4] .................. B32B 3/26; B32B 17/10; B32B 23/08; B32B 31/14
[52] U.S. Cl. .................. 428/317.7; 264/45.3; 264/46.2; 264/46.3; 427/373; 428/317.9; 428/318.4; 428/319.7; 428/422.8; 428/424.6; 428/514; 428/921
[58] Field of Search .............. 428/314.4, 314.8, 317.1, 428/317.5, 317.7, 317.9, 318.4, 318.6, 319.3, 319.7, 319.9, 514, 422.8, 424.6, 921; 427/373; 264/45.3, 46.2, 46.3

[56] References Cited

U.S. PATENT DOCUMENTS

| | | | |
|---|---|---|---|
| 3,061,475 | 10/1962 | Wallace | 428/318.4 |
| 3,240,845 | 3/1966 | Voelker | 264/46.5 |
| 3,303,076 | 2/1967 | Carlson, Jr. et al. | 156/79 |
| 3,415,714 | 12/1968 | Hider | 428/317.5 |
| 3,533,901 | 10/1970 | Sutker | 428/317.1 |
| 3,686,047 | 8/1972 | Miller | 156/79 |
| 3,903,346 | 9/1975 | DeLeon et al. | 428/317.1 |
| 4,011,180 | 3/1977 | Lockwood et al. | 521/115 |
| 4,025,687 | 5/1977 | Wooler et al. | 428/318.4 |
| 4,121,957 | 10/1978 | Allen | 156/79 |
| 4,121,958 | 10/1978 | Koonts | 156/79 |
| 4,169,915 | 10/1979 | Heitmann et al. | 428/318.4 |
| 4,204,019 | 5/1980 | Parker | 428/318.4 |
| 4,212,917 | 7/1980 | Skowronski et al. | 428/318.4 |
| 4,256,799 | 3/1981 | Ohashi et al. | 428/215 |
| 4,292,353 | 9/1981 | Ohashi et al. | 428/211 |
| 4,292,361 | 9/1981 | Ohashi et al. | 428/215 |
| 4,292,363 | 9/1981 | Briggs | 428/247 |
| 4,296,170 | 10/1981 | Ohashi et al. | 428/317.5 |
| 4,346,133 | 8/1982 | Hipchen et al. | 428/109 |
| 4,351,873 | 9/1982 | Davis | 428/198 |
| 4,357,384 | 11/1982 | Jasperson | 428/215 |
| 4,366,203 | 12/1982 | Briggs | 428/304.4 |
| 4,366,204 | 12/1982 | Briggs | 428/304.4 |
| 4,405,682 | 9/1983 | Fujita et al. | 428/317.7 |
| 4,467,014 | 8/1984 | Smith | 428/314.4 |
| 4,645,710 | 2/1987 | Baitinger et al. | 428/317.7 |

OTHER PUBLICATIONS

"Saran Latex 112", Product Bulletin, The Dow Chemical Company, 1984.
"Saran Latex 159", Product Bulletin, The Dow Chemical Company, 1984.

Primary Examiner—William J. Van Balen
Attorney, Agent, or Firm—James W. Grace; Charles W. Vanecek

[57] ABSTRACT

A thermally insulating structural laminate comprising a core of rigid plastic foam having two major surfaces, at least one of the major surfaces of the foam being attached to a facer comprising a fribrous sheet having at least one layer of an air- and moisture-impervious polymer disposed on the inner surface thereof and interposed between the fibrous sheet and the foam, the oxygen transmission of the polymer being a value of less than about 1 cc/100 in$^2$-24 hrs-atm sufficient to make the facer substantially impervious to the passage of air and water vapor, resulting in the long-term preservation of insulation value.

44 Claims, 2 Drawing Sheets

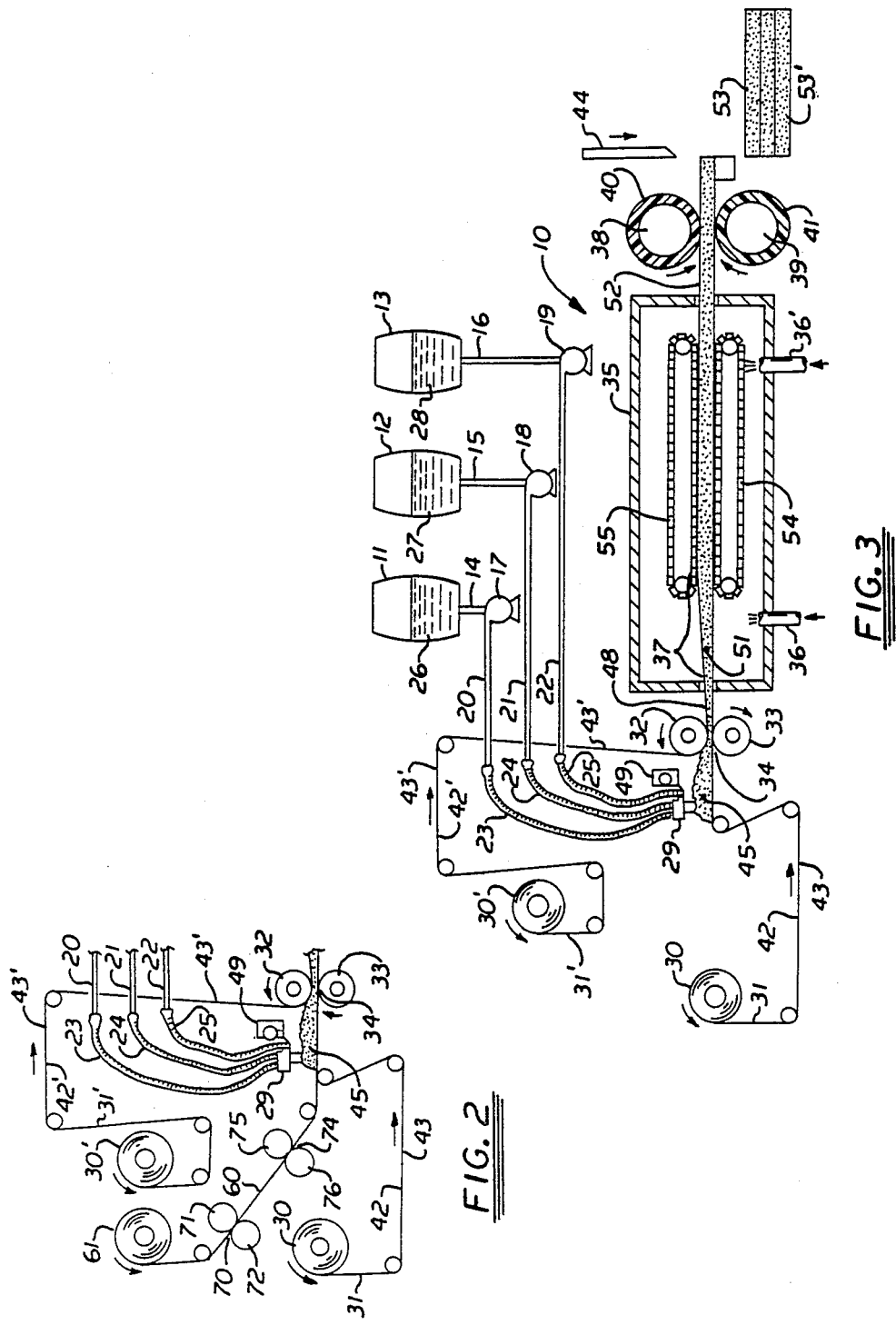

FOAM INSULATION BOARD FACED WITH POLYMER-FIBROUS SHEET COMPOSITE

BACKGROUND OF THE INVENTION

This is a continuation-in-part of application Ser. No. 883,806, filed July 9, 1986.

1. Field of the Invention

This invention relates to laminates and foam filled sheet products, both decorative and structural, and more particularly it relates to structurally rigid, optionally glass fiber reinforced sheets of foam, which are particularly useful in thermal insulating applications. It also relates to a method for forming such a product.

2. Description of the Prior Art

Laminated rigid foam panels are widely used in the building and construction industry as sound and thermal insulating materials and as non-load bearing structural members. These laminated articles having a core of rigid foam can be made continuously or batchwise in a mold. The process of continuous lamination usually involves deposition of a foam-forming plastics mixture onto a facing sheet(s) and bringing a second sheet(s) into contact with the mixture before it sets and sometimes before it foams.

Conveniently, both for economy and ease of handling, the facing sheets are often made of relatively inexpensive flexible materials, such as paper and aluminum foil, which can be fed from rolls. A disadvantage associated with the use of aluminum foil alone as a facer stems from its fragility, which can result, e.g., in foil breakage during foamboard manufacture. While improved facer toughness can be achieved through the use of fibrous facers, such as conventional medium or heavy kraft papers or glass mats, these facers are no match for aluminum foil at providing a barrier against gas penetration. The porosity of fibrous facers allows excessive exposure of the foam material to air with the consequent opportunity for air infiltration into the foam. As is well known in the industry, the thermal conductivity (K-factor) of insulating boards containing fluorocarbon gas is substantially increased where some means is not provided to prevent such air infiltration into the cells of the foam insulation. It would be highly desirable if a foam insulation board could be produced with facers which combine the advantages of a fibrous sheet, e.g., a sheet of paper or glass fibers, and aluminum foil without the disadvantages associated with the use of these facers in the past.

OBJECTS OF THE INVENTION

It is accordingly an object of the present invention to produce a foam insulation board having facers which are tough, lightweight and highly impermeable.

It is another object of this invention to provide an improved method for the continuous production in a simple and economical manner of a foam insulation board having facers which are tough, lightweight and highly air and moisture impermeable.

It is a further object of the present invention to produce a structural laminate by contacting a foam-forming mixture with a facing sheet formed of a layer of air and moisture impermeable polymeric material attached to a fibrous material, and thereafter foaming the foam-forming mixture.

It is a still further object of the present invention to produce an insulation board having a high insulation value and superior fire resistant properties, which would qualify for model building code approvals and approval by the Factory Mutual Research Corporation and Underwriters Laboratories, independent risk certification firms.

It is an additional object of the present invention to provide a paper and/or glass fiber faced rigid foam plastic insulation board which has especially tough and impact-resistant major surfaces, and exhibits overall good properties, including low friability, and good dimensional stability and thermal resistance, and is particularly useful in the building industry.

These and other objects and advantages of the present invention will become more apparent to those skilled in the art when the instant disclosure is read in conjunction with the accompanying drawings.

BRIEF DESCRIPTION OF THE DRAWINGS

FIG. 2 is a schematic elevation of a portion of the apparatus of FIG. 1 showing a glass fiber mat being fed to the nip roll for reinforcement of the structural laminate; and FIG. 3 is a schematic elevation of an apparatus suitable for practicing the process of the invention in a restrained-rise mode.

DESCRIPTION OF THE INVENTION

Figure 1:
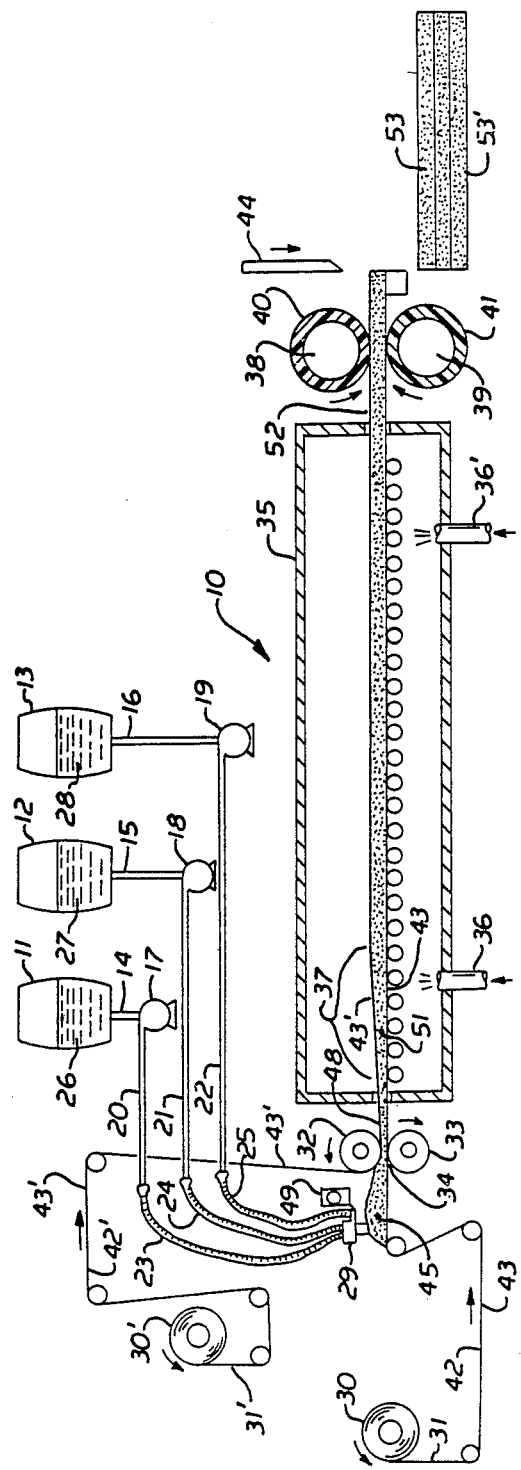
FIG. 1 is a schematic elevation of an apparatus suitable for practicing the process of the invention in a free-rise mode.

The above objects were achieved in the method of the invention which utilizes a laminate facing sheet of fibrous material having a thin layer of a substantially air- and moisture-impermeable polymer (barrier polymer) in the production of a faced foam structural laminate. The oxygen transmission and water vapor transmission rate of the barrier polymer must be low enough to reduce substantially air and water vapor penetration through the fibrous sheet to below the penetration there would be with the polymer omitted. The fibers of the fibrous sheet of the invention may be virtually any fibrous material, either natural or synthetic. For example, the fibers may be asbestos, metal, cotton, hair, glass, or the filament forming synthetic organic polymers such as nylon, polyesters, rayon, cellulosics, or other known synthetic filamentary materials. The fibrous facer may be comprised of two or more fibrous materials or sheets, such as a composite of a paper and glass fiber sheet. The facing sheet advantageously comprises a glass mat or kraft paper coated on one side with a latex emulsion of polyvinylidene chloride copolymers and optionally coated on the other side with a protective coating which may contain a flame retardant. The protective coating may be any material conventionally used to protect paper facers, such as plastic films, e.g., of plasticized PVC, acrylic polymers, etc. The insulation board is suitably manufactured by bringing at least one polymeric film-fibrous facing sheet of the invention into contact with a foam-forming mixture so that the barrier polymeric film of the facing sheet contacts the mixture, and thereafter foaming the foam-forming mixture. The barrier polymer [preferably polyvinylidene chloride copolymer(s)] -coated facer may include at least one other polymer layer contacting the barrier polymer or otherwise forming part of the facer. The additional polymer layer may advantageously be an adhesive material which serves to improve the bond of the composite facer to the foam core of the structural laminate. The process is advantageously performed on a continuous foam production line.

The method of the invention for continuously producing a foam insulation board comprises conveying a lower facing material along a production line; applying a foam-forming mixture to the lower facing material; optionally supplying an upper facing material over the applied foam-forming mixture, at least one facing material being a substantially air- and moisture- impermeable, barrier polymer-fibrous sheet laminate whose polymeric layer is brought into contact with the foam-forming mixture; and foaming and thermally curing the foam-forming mixture. An advancing cover web having surfaces nonadherent to the foam may be used in place of the upper facing material.

The finished foamboard of the invention has at least one barrier polymer-fibrous facing sheet of the invention but preferably has two of them, one on either side of the foam core. A wide variety of other facing materials can be utilized in conjunction with the laminated fibrous facers of the invention. For example, the carrier substrate or lower facer on the production line can be a rigid or flexible material, such as perlite board, gypsum board, fiberboard, a metal sheet such as steel or aluminum, asphalt-saturated felt, a fiber glass sheet, an asphalt fiber glass sheet, etc., while the covering or upper facer on the line is generally a flexible material, and may be an asphalt-saturated felt, an asphalt fiber glass sheet, a fiber glass sheet, a metal sheet (e.g., aluminum foil facer), kraft paper, etc.

The foamable chemical mixture can be deposited on the lower facer from a mixing head which traverses either partially or completely across the width of the facer. The mixture also can be laid down by a stationary mixing head.

After deposition of the foamable mixture and optional application of the upper facer, the resultant composite advances into an expansion zone wherein the foam-forming mixture expands to a cured state. The expansion can be the "free rise" type, such as disclosed in U.S. Pat. No. 4,028,158, where the thickness of the composite is controlled by a gap which is preferably provided by the nip of two rotating rolls. The nip of the two rotating rolls serves as a means for metering the amount of the foamable mixture. Other nip-defining means, as, e.g., the combination of a doctor blade and a fixed plate, also can be employed. The expansion also can be restrained, such as where the foamable material and facer(s) are directed between a pair of spaced conveyor belts which preferably are positioned apart a distance less than the thickness the combination of foam and facer(s) would otherwise ordinarily reach if allowed to foam unrestrictedly.

In the expansion zone, the foamable mixture/facer(s) composite is advantageously subjected to the influence of heat controllably added by the circulation of hot air and cured to a rigid foam structure. In this manner, the resulting faced foam body or slab has two major, relatively flat, parallel surfaces in its final form. The rigid product is then periodically severed into finite lengths, thereby forming discrete panels.

The barrier polymer will advantageously be softenable at the curing temperature so as to enhance the facer to foam bond. Thermal curing of the composite in the expansion zone results in softening of the fibrous facer's barrier polymer layer at the facer/foam interface and promotes adhesion of the facer to the foam core. The curing of the foam can be carried out at temperatures of from about 150° F., or less, to about 350° F., or more, but is preferably carried out at a temperature of from about 200° F. to about 300° F. The time required for curing will depend upon the particular formulation involved and the curing temperature.

Another and highly desirable way of enhancing the fibrous facer/foam bond is by utilizing in the foamboard production a laminated paper or other fibrous material whose barrier polymer layer contains carboxyl groups, which contribute to an increase of the adhesive strength at the interface. Methods of thus activating the surface of a polymeric film are well known to those skilled in the art. U.S. Pat. No. 3,533,901 teaches the oxidation of polyethylene film to form such reactive sites but the paper facing sheets disclosed in this patent could not provide the gas-barrier protection required in the practice of the present invention.

It has been found that a continuous and sealed barrier impervious to air and moisture between adjoining fibrous facer and foam core is achieved by means of the layer or film of impervious polymeric material disposed between the fibrous material and foam. Suitable application methods include coating or lamination of a calendered film to the fibrous material. The thickness of the polymeric film may vary widely, as, e.g., from about 0.3 mil to 5 mils, preferably about 0.5 mil to 2 mils. The impervious polymer is located so as to contact and connect the adjoining major surfaces of the fibrous facer and foam core, thereby forming a continuous and sealed barrier therebetween. Consequently, passage or transmission of air and moisture into the interior structure of the insulating foam material with the attendant aforementioned undesirable results is prevented.

The vapor barrier is conveniently applied on the fibrous sheet by one or more coatings of a barrier polymer(s) in latex form in a total amount of about 5 to 20, preferably about 8 to 15 lbs./3000 ft.$^2$ of barrier polymer solids. The use of heavier weights of coatings or of a calendered film of barrier polymers may be required in the case of certain porous fibrous sheets. The barrier coatings of the invention may be formulated with or without pigments and other ingredients customarily employed in vapor barrier paints. The amounts of such ingredients must be chosen so as not to interfere with the barrier properties. Layers of various other materials, such as of other polymeric films, e.g., polyethylene, adhesives (preferably flame retardant types), aluminum foil, etc., may be used in combination with the barrier polymer layer(s).

Any air and water vapor impervious or substantially impervious polymeric material capable of forming a vapor-tight seal between adjoining fibrous facer and foam surfaces can be utilized for formation of the barrier in accordance with this invention. The air and water vapor impervious, or substantially impervious polymers suitable for the present invention must have an oxygen transmission (cc/100 in$^2$-24 hrs-atm @ 73° F. [23° C.] and 75% RH, ASTM D-1434), which is less than about 1, and preferably no greater than about 0.3, for reduced penetration of air and water vapor through the composite facer. Examples of such barrier polymers are nitrile resins and halogenated vinyl resins, such as polyvinyl chloride and vinylidene chloride copolymers. Halogenated vinyl resins are especially useful because of the fire retardance provided by their halogen content. Excellent gas- and moisture-barrier properties result from use of vinylidene chloride copolymers for the polymer layer of the fibrous facers. These copolymers comprise vinylidene chloride and at least one comonomer selected from unsaturated monomers copolymerizable therewith. As the monomer(s) copolymerizable with vinylidene chloride, vinyl chloride, acrylonitrile, acrylic esters, acrylic acids, etc. can be mentioned. Polymer coatings based on copolymers of vinylidene chloride/acrylonitrile (known as "Saran") are highly suitable.

In a preferred embodiment of the invention, the fibrous sheets employed in facing the foamboards of the invention are comprised of any suitable paper, such as, for example, a medium or heavy kraft paper. Foam laminates of this invention can be produced using sheet stock ranging from 20 lbs./3000 ft.$^2$ paper to 200 lbs./3000 ft.$^2$ cardboard. Especially useful are 30–150, more preferably 50 to 150, lbs./3000 ft.$^2$ kraft papers. The kraft papers may be based on either bleached or natural furnish and may have either MG or MF finishes. Also, the papers may be fire retardant, i.e., formed from furnish containing a fire retardant such as alumina trihydrate or antimony trioxide, or non-fire retardant. However, fire retardance is desirably conferred on non-fire retardant papers in known manner by application to them of conventional flame retardant chemicals, such as those agents which contain phosphorus and/or halogen atoms. Examples of flame retardants include decabromo diphenyl oxide, chlorinated wax emulsions, ammonium phosphate and diammonium phosphate. Other inorganic flame retardants which may be used include agents such as antimony oxides, arsenic oxide, ammonium sulfate, and aluminum oxide hydrate.

It should, of course, be understood that both fire retardant and non-fire retardant paper facers of any weight, furnish or finish can be used in the practice of the present invention provided the composite facer/film forming polymer coating is sufficiently impermeable to air passage through it. The oxygen transmission of the composite laminate facer of the invention preferably is less than about 1, more preferably less than about 0.3, and most preferably less than about 0.1 cc/100 in$^2$-24 hrs-atm. The primary objective of the invention is the establishment of the gas barrier, and secondarily the provision of fire retardance and adjustment of other paper qualities can be suitably handled to prepare the faced insulation boards of the invention for the specific requirements of the intended application.

The total thickness of the foam insulation board may be from about 0.25 to 6.0 inches, of which the thickness of the coated paper facer is typically from about 0.003 in. to 0.025 in., and preferably from about 0.004 in. to 0.014 in.

The laminated facer according to the present invention can be prepared by following generally known procedures for applying polymer latexes onto supporting sheets such as kraft paper. Thus, the barrier polymer latex is coated on the paper facing sheet surface to be bonded, either by roll, immersion, or any other suitable means. A primer coating, which is preferably flame-retardant, may optionally be applied before the polymer coating.

In a preferred embodiment of the invention, two layers of vinylidene chloride copolymers are employed as the gas- and moisture-barrier layer and application of these layers is conveniently accomplished by a multiple station coater. As the vinylidene chloride copolymers in this operation, the Saran polymers (PVDC) in the form of latexes, such as Saran Latex 159 and Saran Latex 112, are preferred. For example, the lamination of a paper sheet is suitably effected by coating the kraft paper web on its finished side utilizing a 4-station coater. Each of the four stations contains a reverse roll, mayer rod coater and the first three coaters are used to apply the PVDC (Saran) latexes. Equal proportions of Saran Latex 112 are applied at the first two coaters, and then an overcoat of Saran Latex 159 is applied at the third station. A coating weight of about 6–10 lbs./3000 ft.$^2$ for Saran Latex 112 and of about 2–5 lbs./3000 ft.$^2$ for Saran Latex 159 may be used. The fourth coater is next employed to apply an exterior protective coating, which may contain a fire retardant chemical, to the other uncoated surface of the kraft paper. Printing of the kraft facer may be accomplished off-line on a separate machine.

The Saran Latex 112 base coat has a lower oxygen transmission value than the Saran Latex 159 overcoat and serves as the main barrier against air infiltration into the core foam. The Saran Latex 159 overcoat also contributes to the air barrier created, but its main function is as an adhesion promoter of the facer/foam bond. This adhesion is promoted chemically through functional carboxyl groups on the Saran film's surface for ready bonding to the core foam chemicals, and mechanically through softening of the Saran 159 layer at process temperatures with slight extrusion into the cellular surface at the facer/foam interface.

The core of the faced product comprises a rigid foam formed from a foam-forming mixture. The foam-forming mixture is one which will result in a rigid foam. The invention is not limited to the nature of the foam material constituting the insulating core, provided that this ensures heat insulation. Polyurethanes, polyisocyanurates and phenolic polymers are well-known materials in laminates, particularly structural laminates, and encompass many desirable properties. Other polymers that can be foamed include rubber, polyvinyl chloride, urea-aldehydes, melamine-aldehydes, polystyrene, polypropylene, polyethylene, cellulose acetate, epoxy resin, acrylonitrile-butadiene-styrene-copolymer and silicones.

Suitable foaming resin compositions are disclosed in U.S. Pat. Nos. 2,577,277, 2,498,621, 2,572,568, 2,623,023 and 2,461,942. Other foamable resin compositions may be used.

The foamable resin compositions may contain any suitable blowing agent know to those skilled in the art, including carbon dioxide, ammonium carbonate, potassium carbonate, hydrogen peroxide and chlorinated and fluorinated hydrocarbons, such as trichlorofluoromethane.

Catalysts, surfactants, dyes and other special additives may be added to the foamable composition, as is well known in the art, in order to effect certain properties. Surfactants, such as polyoxyethylene-sorbitan monopalmitates, polyoxyethylene sorbitan polydimethyl siloxane and polydimethyl siloxane polyoxyalkylene block copolymers, can affect the foam cell size by lowering surface tension and can serve as wetting agents in adhering fibers to foam when glass fiber reinforcement is utilized.

A particularly suitable foam-forming mixture of the present invention is one which will result in a rigid polyurethane or polyisocyanurate foam. The latter foams can be prepared by using standard techniques known to those skilled in the art. These foams can be simply prepared by mixing together an organic polyisocyanate with a polyol, catalyst and blowing agent at temperatures ranging from about 0° C. to 150° C.

The polyurethane foams can be prepared by reacting the polyol and polyisocyanate on an essentially 1:0.9 to 1:1.4 equivalent basis. The polyisocyanurate foams of the invention are prepared by reacting the polyisocyanate with a minor amount of the polyol, such as sufficient polyol to provide about 0.1 to 0.71 hydroxyl equivalents of said polyol per equivalent of said polyisocyanate.

In the broadest aspects of the present invention, any organic isocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4, 4'-biphenyldiisocyanate, 3,3'-dimethyl-4,4'-biphenyl-diisocyanate, and 3,3'-dimethyldiphenylmethane-4,4'-diisocyanate; the triisocyanates such as 4,4',4"-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

The polymethylene polyphenylisocyanates desirably have a functionality of at least 2.1 and preferably 2.5 to 3.8. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

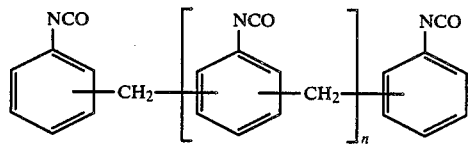

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6–21. It should, therefore, be understood that the polymethylene polyphenylisocyanates available on the market under the trade names of CODE 047 or PAPI-20 (Dow) and MR 200 (Mobay/Bayer) can successfully be employed within the spirit and scope of the present invention.

The polyols which can be employed include, for example, monomeric polyols, such as ethylene glycol, 1,2-propanediol, 1,3-propanediol, 1,4-butanediol, diethylene glycol, dimethylol dicyclopentadiene, 1,3-cyclohexanediol, 1,4-cyclohexanediol, the oxyalkylene adducts of polyol bases wherein the oxyalkylene portion is derived from a monomeric unit such as ethylene oxide, propylene oxide, butylene oxide and mixtures thereof. The polyol initiators include ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, sucrose, toluene diamine and bisphenol A, polyethers such as polyethylene ether glycols, polypropylene ether glycols, polytetramethylene ether glycols, and alkylene oxide adducts of polyhydric alcohols including those listed above; hydroxy terminated tertiary amines of the formula:

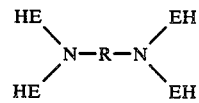

wherein R is an alkylene radical containing at least 2 to 6 carbon atoms and E is a polyoxyalkylene chain; amine based polyethers of the formula:

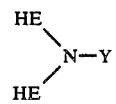

wherein E is a polyoxyalkylene chain and Y is selected from the group consisting of alkyl, hydroxyalkyl and EH; alkylene oxide adducts of acids of phosphorus such as the adducts prepared by the reaction of phosphoric acid and ethylene oxide, phosphoric acid and propylene oxide, phosphorus acid and propylene oxide, phosphonic acid and ethylene oxide, phosphinic acid and butylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and poly-1,4-oxybutylene and polyoxyethylene glycols, and random copolymer glycols prepared from blends or sequential addition of two or more alkylene oxides. Also adducts of the above with trimethylolpropane, glycerine and hexanetriol as well as the polyoxypropylene adducts of higher polyols such as pentaerythritol and sorbitol may be employed. Thus, the polyether polyols which can be employed in the present invention include oxyalkylene polymers which have an oxygen/carbon ratio from about 1:2 to 1:4 and preferably an oxygen carbon atom ratio from about 1:2.8 to 1:4 and from about 2 to 6 terminal hydroxyl groups, preferably about 2 to 4 terminal hydroxyl groups. The polyether polyols generally have an average equivalent weight from about 80 to 10,000 and preferably have an average equivalent weight from about 100 to about 6000. Polyoxypropylene glycols having molecular weights from about 200 to about 4000 corresponding to equivalent weights from about 100 to 2000 and mixtures thereof are particularly useful as polyol reactants. Polyol blends such as a mixture of high molecular weight polyether polyols with lower molecular weight polyether polyols or monomeric polyols can also be employed.

Any suitable hydroxy terminated polyester may also be used. These can be obtained from the reaction of polycarboxylic acids and polyhydric alcohols. Such suitable polycarboxylic acids may be oxalic acid, malonic acid, succinic acid, glutaric acid, adipic acid, pimelic acid, suberic acid, azelaic acid, sebacic acid, basillic acid, thapsic acid, maleic acid, fumaric acid, glutaconic acid, isophthalic acid, terephthalic acid, and phthalic acid. Suitable polyhydric alcohols include the following: ethylene glycol, diethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,4-hexanediol, glycerol, trimethylolpropane, trimethylolethane, hexane 1,2,6-triol, $\alpha$-methylglucoside, pentaerythritol, sorbitol, sucrose, and compounds derived from phenols such as 2,2-bis(4-hydroxyphenol) propane. Aromatic polyester polyols, such as the aromatic Stepanpol polyols of the Stepan Co., are especially useful.

A preferred aromatic polyester polyol is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, the disclosure of which is hereby incorporated by reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Del. under the trade name of Terate ® resins.

An excess of the transesterifying glycol advantageously may be used to react with the residue defined above. The amount of this preferred excess of transesterifying glycol remaining in the transesterified polyol mixture can vary broadly but suitably falls within a range of from about 5 to about 30 percent by weight of said polyol mixture.

The properties of the above tranesterified polyol mixtures which can be employed in accordance with the present invention fall within rather broad ranges. The polyol mixtures are described in U.S. Pat. No. 4,237,238, the disclosure of which is hereby incorporated by reference. A preferred polyol mixture is characterized by a viscosity in cps at 25° C. of about 1,600 to about 2,800, a free diethylene glycol content of from about 20 to about 30 percent by weight of said mixture, a hydroxyl number within a range of from about 400 to about 490, and an acid number of about 0.2 to about 8.

Another preferred aromatic polyester polyol which can be employed is prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An especially useful polyol mixture can be prepared by transesterifying a by-product fraction from the manufacture of dimethyl terephthalate comprising a mixture of (a) about 40 to 60 percent by weight of dimethyl terephthalate,
(b) about 1 to 10 percent by weight of monomethyl terephthalate,
(c) about 1 to 2 percent by weight of terephthalic acid,
(d) about 10 to 25 percent by weight of bi-ring esters,
(e) about 5 to 12 percent by weight of organic acid salts,
(f) about 18 to 25 percent by weight of polymeric materials, and
(g) about 1 to 4 percent by weight of ash.

An excess of the transesterifying glycol is advantageously used to react with the by-product fraction. Two preferred glycols for transesterifying the by-product fraction are ethylene glycol and diethylene glycol, with the latter being more preferred. An example of a transesterified by-product fraction of the invention is the product supplied by Jim Walter Resources, Inc. under the trade designation Foamal 250.

The properties of the polyol mixture produced by transesterifying the by-product fraction defined above are described in U.S. Pat. No. 4,411,949, the disclosure of which is hereby incorporated by reference. A preferred polyol mixture is characterized by a viscosity in cps at 25° C. of about 700 to about 2500, a free diethylene glycol content of from about 10 to about 30 percent by weight of said mixture, a hydroxyl number within a range of from about 350 to about 468, and an acid number of about 0.2 to about 10.

Another preferred polyol component comprises a blend of (a) about 5 percent to about 95 percent by weight of an aromatic polyester polyol having a molecular weight of from about 150 to about 5,000, such as one of the above aromatic polyester polyols or mixtures of these polyols, and (b) about 5 percent to about 95 percent by weight of an alkylene oxide adduct of an aromatic amine of the formula

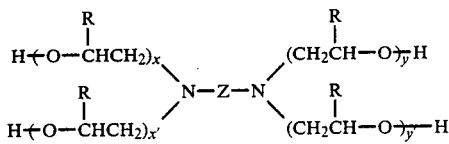

wherein Z is a divalent aromatic radical, x, x′, y, and y′ each independently have an average value from about 1 to about 5, and each R is independently selected from the group consisting of hydrogen, alkyl or aryl, provided that the adduct is capped with ethylene oxide units. A preferred alkoxylated aromatic amine of the blend is an ethylene oxide adduct of toluene diamine isomers of the formula

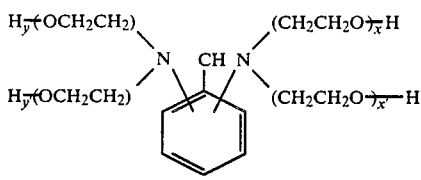

wherein the average number of oxyethylene units per polyoxyethylene chain is from 2 to 3. An example of a suitable, commercially available aromatic-amino polyether polyol of the blend is the product sold by BASF Wyandotte Corporation under the trademark Pluracol ® Polyol 735. The blend is described in U.S. Pat. No. 4,496,625, issued Jan. 29, 1985, the disclosure of which patent is hereby incorporated by reference.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

Other polyols or mixtures of polyols can be employed in the production of the polymeric foam core of the invention. For example, other desirable polyols for use in the present invention are those described in U.S. Pat. Nos. 4,212,917 and 4,711,912, the disclosures of which patents are hereby incorporated by reference.

Suitable catalysts for the foam preparations include the well-known trimerization and urethane catalysts. Examples of trimerization catalysts are 1,3,5-tris (N,N-dialkylaminoalkyl)-s-hexahydrotriazines; the alkylene oxide and water adducts of 1,3,5-tris(N,N-dialkylamino alkyl)-s-hexahydrotriazines; 2,4,6-tris(dimethylaminomethyl)-phenol; o-, p- or a mixture of o- and p-dimethylaminomethylphenol and triethylenediamine or the alkylene oxide and water adducts thereof, alkali metal carboxylates, alkali metal alkoxides, and organic boron-containing compounds. The urethane catalysts include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The catalysts generally comprise from 0.1 to 20 and preferably from 0.3 to 10 weight percent of the total composition.

In the preparation of the polyisocyanurate rigid foams, the preferred catalyst give cream times of 15 to 30 seconds and firm times of 25 to 80 seconds. One preferred type of catalyst is a mixture of a tertiary amino phenol, such as 2,4,6-tris(dimethylaminomethyl)-phenol, and an alkali metal carboxylate, such as potassium-2-ethylhexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.3:1 to 2.5:1.

Any blowing agent typically employed in similar prior art foams can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Trichlorolfluoromethane is a preferred blowing agent.

The foams also can be produced using the froth-foaming method disclosed in U.S. Pat. No. 4,572,865. In this method, the frothing agent can be any material which is inert to the reactive ingredients and is easily vaporized at atmospheric pressure. The frothing agent advantageously has an atmospheric boiling point of −50° to 10° C., and includes dichlorodifluoromethane, monochlorodifluoromethane, trifluoromethane, monochlorotrifluoromethane, monochloropentafluoroethane, vinylfluoride, vinylidene-fluoride, 1,1-difluoroethane, 1,1,1-trichlorodifluoroethane, and the like. Particularly preferred is dichlorodifluoromethane. A higher boiling blowing agent is desirably used in conjunction with the frothing agent. The blowing agent is a gaseous material at the reaction temperature and advantageously has an atmospheric boiling point ranging from about 10° to 80° C. Suitable blowing agents include trichloromonofluoromethane, 1,1,2-trichloro-1,2,2-trifluoroethane, acetone, pentane, and the like, preferably trichloromonofluoromethane.

The foaming agents, e.g., trichlorofluoromethane blowing agent or combined trichlorofluoromethane blowing agent and dichlorodifluoromethane frothing agent, are employed in an amount sufficient to give the resultant foam the desired bulk density which is generally between 0.5 and 10, and preferably between 1 and 5 pounds per cubic foot. The foaming agents generally comprise from 1 to 30, and preferably comprise from 5 to 20 weight percent of the composition. When a foaming agent has a boiling point at or below ambient, it is maintained under pressure until mixed with the other components. Alternatively, it can be maintained at sub-ambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Jim Walter Resources, Inc. under the trademarks FOAM-STAB 100 and 200. Generally, the surfactant comprises from about 0.05 to 10, and preferably from 0.1 to 6, weight percent of the foam-forming composition.

Other additives may also be included in the foam formulations. Included are flame retardants, such as tris (2-chloroethyl)-phosphate, dispersing agents, plasticizers, fillers and pigments.

Referring now to the drawings, and in particular to FIG. 1, there is shown schematically an apparatus 10 suitable for use in connection with the present invention. The apparatus 10 comprises tanks 11, 12 and 13 for containing the foaming ingredients and additives such as blowing agent (e.g., fluorocarbon), surfactant, etc., each respectively connected to outlet lines 14, 15, and 16. The lines 14, 15 and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of a barrier polymer-coated kraft paper 31 of the invention comprising an upper layer of a substantially air- and moisture-impermeable polymer 42 adhered to a lower kraft paper facing sheet 43, and a roll 30' of another barrier polymer-coated kraft paper 31' having polymeric layer 42' adhered to paper facing sheet 43'. The apparatus 10 is also provided with metering rolls 32 and 33 and an oven 35 provided with vents 36 and 36' for introducing and circulating hot air. The apparatus 10 is also provided with pull rolls 38 and 39 each of which preferably has a flexible outer sheath 40 and 41. The apparatus 10 is also provided with cutting means 44 for severing the structural laminate produced by this process into finite lengths thereby producing discrete panels.

In operation, the tanks are charged with the foam-forming mixture in whatever manner is convenient and preferred for the specific polymer. For instance, for a urethane foam, the polyol can be in one tank, the polyisocyanate in another and catalyst in a third. Other polymers such as polyvinyl chloride can be used as a dispersion in plasticizers and a blowing agent introduced. Or polyvinyl chloride can be extruded as can polystyrene, cellulose acetate and the polyolefins among others. Rubber and urea-formaldehyde can be frothed and admixed with the appropriate blowing agent and surfactant. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25 whereupon they are mixed in the mixing head 29 to form the liquid foam-forming mixture 45 which contacts the polymer layer 42 of the kraft paper 31 fed from the roll 30 toward the nip 34 between the two rotating metering rolls 32 and 33.

By virtue of rotation of the pull rolls 38 and 39, the lower polymer-coated kraft paper 31 is pulled from the roll 30, and the upper polymer-coated kraft paper 31' is pulled from the roll 30'. The two kraft papers having the foam-forming mixture 45 therebetween pass through the nip 34 of the two rotating metering rolls 32 and 33. The mixing head 29 is caused to move back and forth, normal to the running length of the kraft paper by virtue of a reciprocating means 49. In this manner, an even amount of foam-forming mixture 45 can be maintained upstream from the nip 34 and in contact with the polymer layer 42 of kraft paper 31. The velocities of the upper and lower coated kraft papers are substantially equal as they pass between the nip 34 of the two rolls.

After passing between the nip of the two rolls 32 and 33, the composite structure 48 having lower and upper paper facers now passes into oven 35 and while in the oven 35 the foam-forming mixture expands in an expansion zone 37. This expansion is initiated by heat generated in an exothermic reaction between the components 26, 27, and 28 of the foam-forming mixture 45 and is regulated by heat added to the oven 35 by the hot air from vents 36 and 36'. The temperature within the oven 35 is controlled by varying the temperature of the hot air from vents 36 and 36' in order to insure that the oven temperature is maintained within the desired limits necessary to cure the foam and to soften the barrier polymers for improved adhesion at the foam/paper interface, as, e.g., from 100° F. to 350° F. and preferably 150° F. to 250° F.

The expanding foam 51, under continuing influence of the heat added to the oven 35 by the controlled introduction of hot air from vents 36 and 36', cures to form the structural laminate 52 of this invention. The structural laminate 52 then leaves the oven 35, passes between the pull rolls 38 and 39, and is cut by cutting means 44 into finite lengths thereby forming discrete panels 53 and 53' of the structural laminate 52.

Referring now to FIG. 2, the apparatus and process are the same as shown in FIG. 1 but here a reinforcing web or scrim 60 is being pulled from the roll 61 and fed into the apparatus by virtue of rotation of the pull rolls 38 and 39, as described in U.S. Pat. No. 4,438,166, the disclosure of which regarding introduction of the reinforcing web in the foam board is incorporated herein by reference. The scrim can be made from threads or yarns of any material which is non-flammable and dimensionally stable, particularly yarns which are stable to temperature changes. Fiberglass fibers are generally preferred for most applications. An example of a suitable reinforcing web 60 is the type of glass mat used in producing the composite article of U.S. Pat. No. 4,438,166, i.e., a mat of long, generally straight glass fibers. Advantageously, the glass fibers are arranged in layers and the direction of the glass fibers in each layer is at an angle to the direction of the glass fiber in each next adjacent layer.

An apparatus by which stretching of the fiber mat 60 is accomplished is shown in FIG. 2. As shown in FIG. 2, the mat 60 passes first between the nip 70 of a first pair of rolls 71, 72 and then through the nip 74 of a second pair of rolls 75, 76. The axes of the rolls 71, 72, 75, 76 are perpendicular to the running length of the mat 60. The nips 70, 74 of each pair of rolls 71, 72 and 75, 76 engage the mat 60. The peripheral speed of the second pair of rolls, namely, rolls 75, 76, is greater than the peripheral speed of the first pair of rolls, namely, the rolls 71, 72. The difference in peripheral speed is adjusted such that stretching of the mat 60 is accomplished in the running or machine direction. This direction is parallel to the running length of the mat 60. An alternative to the arrangement of the two pairs of rolls is to provide the roll 61 with a brake which slows the advance of the mat 60 from the roll 61 as the mat 60 is pulled therefrom. Another and more desirable alternative for stretching of the fiber mat is to pass it through intermeshing corrugated rolls which effect a transverse stretching.

A restrained rise production line for manufacturing structural laminates in accordance with the invention is schematically shown in FIG. 3. The restrained rise process can be accomplished generally in the same manner and with the same material and apparatus as the above-described free rise system, with certain exceptions. Specifically, the restrained rise process employs conveyor belts to restrain the expanding foam and may or may not employ the metering rolls used in the free rise method. In the embodiment shown in FIG. 3, metering rolls are used. Upper polymer-coated kraft paper 31', and the applied foam-forming mixture 45 on the lower polymer-coated kraft paper 31 move into oven 35. Lower and upper endless conveyor belts 54 and 55 are positioned in oven 35 to contain the expanding foam therebetween. Lower coated paper 31 and upper coated paper 31' are drawn along the opposed surfaces of conveyors 54 and 55, respectively. Both endless conveyors 54 and 55 can comprise a series of articulated platens, such as described in U.S. Pat. No. 4,043,719, the disclosure of which is incorporated herein by reference. The platens are supported on and run over rollers.

The distance between the horizontal planes of the facing portions of conveyors 54 and 55 can be preset to determine the thickness of the final board. This distance is suitably less than the combined thickness of facers 31 and 31' and the foam which would otherwise result if the mixture 45 were allowed to foam unrestrictedly. As the foaming mixture further expands upwardly, it comes into contact with coated paper 31', forcing the paper facer against conveyor 55 and causing the facer to assume a substantially planar disposition on the upper correspondingly planar surface of foam 51. The foam becomes securely interlocked with the kraft paper facing sheets on its major surfaces. Curing of the foam in oven 35 and subsequent processing are accomplished in the manner hereinbefore described.

Rigid isocyanurate foam boardstock faced with the laminated paper sheets of the invention possess a combination of desirable properties. The new paper facers make the board surfaces particularly tough and impact resistant, and consequently the lightweight insulation boards are characterized by good handleability. Furthermore, these foam boards exhibit both excellent insulation properties as well as good fire resistant properties, which qualify for model building code approvals and approval by the Factory Mutual Research Corporation and Underwriters Laboratories. For example, paper faced polyisocyanurate foam insulation boards of the invention have received Class I and Class II flame spread ratings from Underwriters Laboratories, and FM Class I approvals for insulated, steel deck roof constructions. In addition, the boards have good dimensional stability and undergo minimal shrinkage and warping at high or low temperatures. The boards can be hot mopped with asphalt and will still retain their long-term high insulation value.

The present invention is further illustrated by the following example in which all parts and percentages are by weight unless otherwise indicated.

EXAMPLE

This example illustrates the continuous production of paper faced foam insulation boards of the invention by reference to FIGS. 1 and 2 of the drawings.

The following isocyanurate formulation was used in preparing the foam core of the insulation boards.

| Item | Ingredient | Parts |
|---|---|---|
| A | Polymethylene polyphenyl isocyanate | 220 |
| B | Trichloromonofluoromethane | 49 |
| C | Organosilicone surfactant | 2 |
| D | Aromatic polyester polyol | 80 |

| Item | Ingredient | Parts |
|---|---|---|
| E | 2,4,6-tris(dimethylaminomethyl) phenol | .77 |
| F | Potassium-2-ethylhexoate | 4.62 |
| G | Diethylene glycol | 4.62 |

Item A has an equivalent weight of 138 and a viscosity of 1700–2500 centipoises at 25° C. and is available from the Mobay Chemical Company, Pittsburgh, Pa. under the trade name MONDUR MR-200.

Item C is that supplied by the Union Carbide Corporation under the trade designation Y-10222.

Item D is that supplied by Jim Walter Resources, Inc. under the trade name Foamol 250.

Items E and F are employed in the form of a solution in the diethylene glycol (item G).

For each insulation foam board, items A, B and C of the above formulation were mixed with each other and placed in tank 11. Item D was placed in tank 12 and the catalytic composition comprising a solution of items E and F in item G was placed in tank 13. Table I below shows for the production of each of boards A to H the composition of the top and bottom facers utilized.

In the continuous production of each of insulation boards A to H, the rolls 38 and 39 were started to pull the respective top and bottom facers toward the nip 34 between the two rotating metering rolls 32 and 33. The pumps were operated to deliver the contents of tanks 11, 12 and 13 to the mixing head 29. The contents of tank 11 were maintained at 60° F., whereas the contents of tanks 12 and 13 were at 60°–90° F. The reciprocating mixing head 29 deposited the foam-forming mixture on polymeric layer 42 of the lower facer in the case of all boards except for board G, in whose production a thin and expansible mat 60 of glass fibers arranged in layers was fed above the bottom facer, as shown in FIG. 2 and described in U.S. Pat. No. 4,438,166. Immediately downstream of the laydown point of the foam-forming mixture, in the direction of conveyor travel, upper facer 31' was brought into contact with the foamable mixture-coated surface of the bottom facing material. As illustrated in FIG. 1, this was suitably effected by passing upper facer 31' around metering roll 32 and through nip 34. At metering rolls 32 and 33 the upper and lower facers were brought together in surface-to-surface opposition relative to each other, with the foamable mixture sandwiched in between. The composite facers and foamable mixture then passed through the nip 34 of the two rotating rolls into oven 35. In the oven, which was maintained at a temperature of 225° F., the foam-forming mixture expanded in the expansion zone 37 to a substantially uniform thickness. In the case of foam board G, the layers of fibers of mat 60 expanded with the foam. After leaving the oven, the product was cut into discrete panels. Various properties of each of the resulting faced foam insulation boards A to H are reported in Table II below. The results of Table II reveal that the laminates of the invention possess a combination of desirable properties, including a slow K-factor drift value. The higher drift value encountered in the case of foam board C is attributable to the nonattainment of an adequate barrier film, with the result that the oxygen transmission value of the composite facer was greater than 1 cc/100 in$^2$-24 hrs-atm.

TABLE I

LAMINATE FACERS OF FOAM INSULATION BOARDS
LAMINATE FACER

| FOAM INSULATION BOARD | Paper Type Top and Bottom Facer | Top Facer | Bottom Facer | Inner Coating of Facer | Outer Coating of Facer |
|---|---|---|---|---|---|
| A | 50 lb. Bleached Northern Kraft[1] | | | Saran Latex 112/ Saran Latex 159[4] | Blend of Flame Retardent & Acrylic Latex[5] |
| B | 50 lb. Bleached Northern Kraft[1] | | | Saran Latex 112/ Saran Latex 159[4] | Blend of Flame Retardent & Acrylic Latex[5] |
| C | 44 lb. Flame Retarded Kraft[2] | | | Saran Latex 112/ Saran Latex 159[4] | Acrylic Latex[6] |
| D | 50 lb. Bleached Northern Kraft[3] | | | Saran Latex 112/ Saran Latex 159[4] | Blend of Flame Retardent & Acrylic Latex[5] |
| E | 50 lb. Bleached Northern Kraft[3] | | | Saran Latex 112/ Saran Latex 159[4] | Blend of Flame Retardent & Acrylic Latex[5] |
| F | 50 lb. Bleached Northern Kraft[1] | | | Saran Latex 112/ Saran Latex 159[4] | Blend of Flame Retardent & Acrylic Latex[7] |
| G | | 30 lb. Bleached Northern Kraft[1] | 0.0009 in., H 19 Aluminum Foil | Saran Latex 112/ Saran Latex 159[4] Epoxy Washcoat | Blend of Flame Retardent & Acrylic Latex[7] — |
| H | | Aluminum Foil/ Kraft Paper/Aluminum Foil Trilaminate | 0.0009 in., H 19 Aluminum Foil | Epoxy Washcoat Epoxy Washcoat | — — |

Footnotes:
[1]Thilmany paper supplied by Thilmany Pulp & Paper Co. and coated by American Packaging Corp.
[2]Fitchburg paper containing antimony trioxide supplied by Fitchburg Paper Co. and coated by Printpack Inc.
[3]Mosinee paper supplied by Mosinee Paper Corp. and coated by Printpack Inc.
[4]Saran Latex 112 base coat coverage of 8 lb./3000 ft.$^2$ and Saran Latex 159 top coat coverage of 2-3 lb./3000 ft.$^2$.
[5]The flame retardant and acrylic latex are blended in a weight ratio of 10:1 and applied at a coverage of 5 lb./3000 ft.$^2$. The flame retardant is supplied by White Chemical Corp. under the trade name Caliban F/R P-44, and the acrylic latex is supplied by Rohm and Haas Co. under the trade name Rhoplex TR-407.
[6]The acrylic latex, which is supplied by Rohm and Haas Co., is applied at a coverage of 2-3 lb./3000 ft.$^2$.
[7]The flame retardant and acrylic latex are blended in a weight ratio of 5:1 and applied at a coverage of 5 lb./3000 ft.$^2$. The flame retardant is supplied by Witco Chemical Co. under the trade name Fyrarrestor 330, and the acrylic latex is supplied by Rohm and Haas Co. under the trade name Rhoplex TR-407.

TABLE II

PROPERTIES OF FOAM INSULATION BOARDS

| PROPERTY | A | B | C | D | E | F | G | H |
|---|---|---|---|---|---|---|---|---|
| Thickness (in.) | 1 | 7/16 | 1 | 1 | 7/16 | 1 | 1 | 1 |
| Core Density (lb./ft.$^3$) | 1.63 | 1.67 | 1.66 | 1.66 | 1.69 | 1.65 | 1.68 | 1.66 |
| Core Glass (g./ft.$^2$) | | | | | | | 2.5 | |
| Compressive Strength[1] (p.s.i.) | 26 | 20 | 36 | 26 | | 36.7 | 24 | 25.2 |
| Flexural Strength[2] MD/TD (p.s.i.) | 42/53 | 345/369 | 70/71.5 | 68/85.5 | 156/55 | 52/47 | 56/52 | 63/52.5 |
| Dimensional Stability,[3] 7 days (% change) | | | | | | | | |
| −40° F. | −0.02 | 0.07 | −0.02 | −0.04 | 0.02 | −0.09 | −0.08 | 0.47 |
| 158° F./95% R.H. | 3.61 | 3.13 | 3.53 | 2.44 | 2.96 | 1.47 | 0.323 | 1.18 |
| 200° F. | 1.98 | 0.85 | 2.95 | 1.14 | 0.66 | 3.38 | 0.204 | −0.10 |
| Water Absorption[4] (% Vol.) | 1.44 | 3.19 | 1.15 | 1.04 | 1.33 | 1.15 | 0.94 | |
| E-84 Tunnel[5] (Flame Spread/Smoke) | | | | | | | | |
| SLIT | 38/79 | 33/88 | 23/171 | 23/94 | 28/73 | 51/107 | 36/77 | Unclassifiable[7] with trilaminate to flame |
| UNSLIT | 33/148 | 36/88 | 20/93 | 25/139 | 23/127 | 33/109 | 33/90 | |
| K-Factor (Btu-in/hr-ft.$^2$ °F.)/days | | | .178/244 | .148/244 | .140/245 | .144/363 | .142/320 | .140/300 |
| Closed Cells[6] (%) | 92 | | 86.5 | 90.4 | | | | |

[1]According to ASTM Test Method F-1621-73.
[2]According to ASTM Test Method C-203.
[3]According to ASTM Test Method D-2126.
[4]According to ASTM Test Method C-272.
[5]According to ASTM Test Method E-84.
[6]According to ASTM Test Method D-2856-70.
[7]Flame to end of tunnel in less than 30 sec.

We claim:
1. A thermally insulating structural laminate comprising a core of rigid plastic foam having two major surfaces, at least one of the major surfaces of the foam being attached to a facer comprising a fibrous sheet having at least one polymeric layer comprising a vinylidene chloride copolymer disposed on the inner surface thereof and interposed between the fibrous sheet and the foam, the oxygen transmission of the facer being a value of less than about 1 cc/100 in²-24 hrs-atm sufficient to make the facer substantially impervious to the passage of air and water vapor, and the foam being formed in contact with the polymeric layer.

2. The structural laminate of claim 1 wherein the other major surface of the rigid plastic foam is attached to a facer selected from the group consisting of a metal sheet, perlite board, gypsum board, fiberboard, asphalt-saturated felt, fiber glass sheet, and asphalt fiber glass sheet.

3. The structural laminate of claim 1 wherein the fibrous sheet comprises a member selected from the group consisting of a paper sheet, a glass fiber sheet and composites thereof.

4. The structural laminate of claim 1 wherein the fibrous sheet comprises a paper sheet.

5. The structural laminate of claim 1 wherein at least one other polymeric layer is present to improve adherence of the facer to the foam.

6. The structural laminate of claim 1 wherein the surface of the vinylidene chloride copolymer contacts the foam and has carboxyl groups to increase adhesion of the facer to the foam.

7. The structural laminate of claim 1 comprising a core of rigid plastic foam having two major surfaces and a facer on each of the major surfaces, each facer comprising a fibrous sheet having at least one layer of a vinylidene chloride copolymer disposed on the inner surface thereof and interposed between the fibrous sheet and the foam, the oxygen transmission of each facer being a value of less than about 1 cc/100 in²-24 hrs-atm sufficient to make the facer substantially impervious to the passage of air and water vapor.

8. The structural laminate of claim 7 wherein at least one other polymeric layer is present to improve adherence of each facer to the foam.

9. The structural laminate of claim 7 wherein the fibrous sheets may be the same or different and comprise a member selected from the group consisting of a paper sheet, a glass fiber sheet and composites thereof.

10. The structural laminate of claim 9 wherein the rigid plastic foam is a member selected from the group consisting of polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone foams.

11. The structural laminate of claim 10 wherein the oxygen transmission value of each facer is less than about 0.3 cc/100 in²-24 hrs-atm.

12. The structural laminate of claim 10 wherein the rigid plastic foam is reinforced by glass fibers.

13. The structural laminate of claim 10 wherein the outer surface of each fibrous sheet is coated with a protective coating containing a flame retardant.

14. The structural laminate of claim 10 wherein two polymeric layers are interposed between each fibrous sheet and the adjacent foam surface, the first polymeric layer comprising a first vinylidene chloride copolymer disposed on the fibrous sheet surface and the second polymeric layer being interposed between the first polymeric layer and foam and comprising a second vinylidene chloride copolymer having a higher oxygen transmission value than the first vinylidene chloride copolymer.

15. The structural laminate of claim 14 wherein the surface of the second vinylidene chloride copolymer contacts the foam and has carboxyl groups to increase adhesion of the facer to the foam.

16. The structural laminate of claim 7 wherein each fibrous sheet comprises a paper sheet.

17. The structural laminate of claim 16 wherein the rigid plastic foam is a member selected from the group consisting of polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone foams.

18. The structural laminate of claim 17 wherein the rigid plastic foam is reinforced by glass fibers.

19. The structural laminate of claim 17 wherein the oxygen transmission of each facer is less than about 0.3 cc/100 in²-24 hrs-atm.

20. The structural laminate of claim 19 wherein at least one other polymeric layer is present to improve adherence of each facer to the foam.

21. The structural laminate of claim 19 wherein the surface of the vinylidene chloride copolymer contacts the foam and has carboxyl groups to increase adhesion of the facer to the foam.

22. The structural laminate of claim 17 wherein the outer surface of each paper sheet is coated with a protective coating containing a flame retardant.

23. The structural laminate of claim 22 wherein at least one other polymeric layer is present to improve adherence of each facer to the foam.

24. The structural laminate of claim 22 wherein the surface of the vinylidene chloride copolymer contacts the foam and has carboxyl groups to increase adhesion of the facer to the foam.

25. The structural laminate of claim 17 wherein two polymeric layers are interposed between each paper sheet and the adjacent foam surface, the first polymeric layer comprising a first vinylidene chloride copolymer disposed on the paper sheet surface and the second polymeric layer being interposed between the first polymeric layer and foam and comprising a second vinylidene chloride copolymer having a higher oxygen transmission value than the first vinylidene chloride copolymer.

26. The structural laminate of claim 25 wherein the rigid plastic foam is a polyisocyanurate foam.

27. The structural laminate of claim 25 wherein the surface of the second vinylidene chloride copolymer contacts the foam and has carboxyl groups to increase adhesion of the facer to the foam.

28. The structural laminate of claim 25 wherein the rigid plastic foam is a member selected from the group consisting of polyurethane and polyisocyanurate foams.

29. The structural laminate of claim 28 wherein the surface of the second vinylidene chloride copolymer contacts the foam and has carboxyl groups to increase adhesion of the facer to the foam.

30. The structural laminate of claim 29 wherein the outer surface of each paper sheet is coated with a protective coating containing a flame retardant.

31. The structural laminate of claim 25 wherein the rigid plastic foam is a polyisocyanurate foam comprising the reaction product of a polymethylene polyphenylisocyanate, an aromatic polyester polyol, a fluorocarbon blowing agent and a trimerization catalyst.

32. The structural laminate of claim 31 wherein each paper sheet comprises kraft paper weighing 50 to 150 lbs./3000 ft.², and coated with 5 to 20 lbs./3000 vinylidene chloride copolymers.

33. A process for continuously producing a thermally insulating structural laminate comprising a rigid plastic foam core having two major surfaces and a facing material on at least one of the major surfaces, the method comprising:
  (a) conveying a lower facing material along a production line;
  (b) applying a foam-forming mixture to the lower facing material;
  (c) optionally supplying an upper facing material over the applied foam-forming mixture, at least one facing material comprising a fibrous sheet having at least one polymeric layer comprising a vinylidene chloride copolymer disposed on one surface thereof, the oxygen transmission of the facing material being a value of less than about 1 cc/100 in$^2$-24 hrs-atm sufficient to make the facing material substantially impervious to the passage of air and water vapor, and the fibrous sheet being positioned so that the polymeric layer is brought into contact with the foam-forming mixture; and
  (d) foaming and thermally curing the foam-forming mixture.

34. The process of claim 33 wherein the thermal curing is carried out at a temperature from about 150° F. to 250° F.

35. The process of claim 33 wherein an upper facing material is supplied over the applied foam-forming mixture and both the upper and lower facing materials comprise a fibrous sheet having at least one polymeric layer comprising a vinylidene chloride copolymer disposed on one surface thereof, the oxygen transmission of each facing material being a value of less than about 1 cc/100 in$^2$-24 hrs-atm sufficient to make the facing materials substantially impervious to the passage of air and water vapor, and each facing material being positioned so that the polymeric layer is brought into contact with the foam-forming mixture.

36. The process of claim 35 wherein the fibrous sheets may be the same or different and comprise a member selected from the group consisting of a paper sheet, a glass fiber sheet and composites thereof.

37. The process of claim 36 wherein each fibrous sheet comprises a paper sheet.

38. The process of claim 37 wherein the foam-forming mixture comprises a mixture for forming a rigid polymer foam selected from the group consisting of polyurethane, polyisocyanurate, phenolic, rubber, polyvinyl chloride, urea-aldehyde, melamine-aldehyde, polystyrene, polypropylene, polyethylene, cellulose acetate, epoxy, acrylonitrile-butadiene-styrene copolymer and silicone foams.

39. The process of claim 38 wherein the surface of the vinylidene chloride copolymer of each paper sheet is brought into contact with the foam-forming mixture and contains carboxyl groups for improved adhesion of the paper sheet to the rigid foams.

40. The process of claim 38 wherein two polymeric layers are disposed on each paper sheet, the first polymeric layer comprising a first vinylidene chloride copolymer disposed on the paper sheet surface and the second polymeric layer being disposed on the first polymeric layer and comprising a second vinylidene chloride copolymer having a higher oxygen transmission value than the first vinylidene chloride copolymer and containing carboxyl groups for improved adhesion of the paper sheet to the rigid foam, and each facing material being positioned so that the second polymeric layer is brought into contact with the foam-forming mixture.

41. The process of claim 40 wherein the foam-forming mixture comprises a mixture for forming a polyisocyanurate foam.

42. The process of claim 41 wherein each paper sheet comprises kraft paper weighing 50 to 150 lbs./3000 ft.$^2$, and coated with 5 to 20 lbs./3000 ft.$^2$ of vinylidene chloride copolymers.

43. The process of claim 42 wherein the outer surface of each paper sheet is coated with a protective coating containing a flame retardant.

44. The process of claim 43 wherein, before step (b), a mat of reinforcing glass fibers is introduced above the lower facing material so that the foam-forming mixture is applied to the mat of glass fibers and a sandwich is formed of the upper and lower facing materials with the foam-forming mixture and reinforcing fibers therebetween.

* * * * *